United States Patent
Xu et al.

(10) Patent No.: US 11,249,887 B2
(45) Date of Patent: Feb. 15, 2022

(54) DEEP Q-NETWORK REINFORCEMENT LEARNING FOR TESTING CASE SELECTION AND PRIORITIZATION

(71) Applicant: NEC Laboratories America, Inc., Princeton, NJ (US)

(72) Inventors: Jianwu Xu, Titusville, NJ (US); Haifeng Chen, West Windsor, NJ (US); Yuchen Bian, Santa Clara, CA (US)

(73) Assignee: NEC Corporation

( * ) Notice: Subject to any disclaimer, the term of this patent is extended or adjusted under 35 U.S.C. 154(b) by 0 days.

(21) Appl. No.: 16/998,224

(22) Filed: Aug. 20, 2020

(65) Prior Publication Data
US 2021/0064515 A1    Mar. 4, 2021

Related U.S. Application Data

(60) Provisional application No. 62/910,870, filed on Oct. 4, 2019, provisional application No. 62/892,040, filed on Aug. 27, 2019.

(51) Int. Cl.
*G06F 9/44* (2018.01)
*G06F 11/36* (2006.01)
*G06N 20/00* (2019.01)

(52) U.S. Cl.
CPC ...... *G06F 11/3684* (2013.01); *G06F 11/3688* (2013.01); *G06F 11/3692* (2013.01); *G06N 20/00* (2019.01)

(58) Field of Classification Search
CPC ............. G06F 11/3684; G06F 11/3688; G06F 11/3692; G06N 20/00
See application file for complete search history.

(56) References Cited

PUBLICATIONS

Shen at al., "Using Semi-Supervised Clustering to Improve Regression Test Selection Techniques", Proceedings—4th IEEE International Conference on Software Testing, Verification, and Validation, ICST 2011, Nov. 2011, 10 pages.

De Souza et al., "Search Based Constrained Test Case Selection Using Execution Effort", Expert Syst. Appl. 40, 2013 Sep. 2013, pp. 4887-4896.

Di Nardo et al., "Coverage-Based Test Case Prioritization: An Industrial Case Study", In Proceedings of the 2013 IEEE Sixth International Conference on Software Testing, Verification and Validation (ICST '13), Mar. 2013, pp. 302-311.

(Continued)

*Primary Examiner* — Chat C Do
*Assistant Examiner* — Lenin Paulino
(74) *Attorney, Agent, or Firm* — Joseph Kolodka (57) ABSTRACT

Systems and methods for automated software test design and implementation. The system and method being able to establish an initial pool of test cases for testing computer code; apply the initial pool of test cases to the computer code in a testing environment to generate test results; preprocess the test results into a predetermined format; extract metadata from the test results; generate a training sequence; calculate a reward value for the pool of test cases; input the training sequence and reward value into a reinforcement learning agent; utilizing the value output from the reinforcement learning agent to produce a ranking list; prioritizing the initial pool of test cases and one or more new test cases based on the ranking list; and applying the prioritized initial pool of test cases and one or more new test cases to the computer code in a testing environment to generate test results.

12 Claims, 7 Drawing Sheets

(56) References Cited

PUBLICATIONS

Kim et al., "A History-Based Test Prioritization Technique for Regression Testing in Resource Constrained Environments", 1CSE'02, May 2002, pp. 119-129.

Kwon et al., "Test Case Prioritization Based on Information Retrieval Concepts", 2014 21st Asia-Pacific Software Engineering Conference, Dec. 2014, pp. 19-26.

Noguchi et al., "History-Based Test Case Prioritization for Black Box Testing on a New Product using Ant Colony Optimization", 2015 IEEE 8th International Conference on Software Testing, Verification and Validation, Apr. 2015, 2 pages.

Sukhbaatar et al., "End-To-End Memory Networks", In Advances in Neural Information Processing Systems, Dec. 2015, pp. 2440-2448.

DEEP Q-NETWORK REINFORCEMENT LEARNING FOR TESTING CASE SELECTION AND PRIORITIZATION

RELATED APPLICATION INFORMATION

This application claims priority to Provisional Application No. 62/892,040 filed on Aug. 27, 2019, incorporated herein by reference in its entirety, and Provisional Application No. 62/910,870 filed on Oct. 4, 2019, incorporated herein by reference in its entirety.

BACKGROUND

Technical Field

The present invention relates to automated software testing and more particularly automated test case design and implementation.

Description of the Related Art

Testing is an important phase in the life cycle of a computer project and test design is an important aspect of the testing phase. Software testing assures product quality, customer satisfaction, and security. In testing computer programs and code, a tester chooses inputs to exercise paths through the code and determine whether the outputs were expected. The goal of testing design is to prepare code tests that discover system faults or bugs as early as possible, and at the same time achieve the maximum code coverage. Test cases can be designed and prepared to test the inputs and verify the output of the software program and/or computer system. Each entry and exit point of a subprogram may be exercised. Testing case selection and prioritization can be one of the most important parts of testing case design. Code testing can miss parts of the computer code or be redundant with other test cases, so it is paramount that the right test cases are selected to test as much code and as many input and output scenarios, as possible, effectively and efficiently because there is limited time and resources for code testing.

White-box testing is a method of testing the software applications at the level of the source code.

SUMMARY

According to an aspect of the present invention, a computer implemented method for automated software test design and implementation is provided. The method includes establishing an initial pool of test cases for testing computer code; applying the initial pool of test cases to the computer code in a testing environment to generate test results; preprocessing the test results into a predetermined format; extracting metadata from the test results; generating a training sequence; calculating a reward value, r, for the pool of test cases; inputting the training sequence and reward value into a reinforcement learning agent; utilizing the value output from the reinforcement learning agent to produce a ranking list, prioritizing the initial pool of test cases and one or more new test cases based on the ranking list, and applying the prioritized initial pool of test cases and one or more new test cases to the computer code in a testing environment to generate test results.

According to another aspect of the present invention, a system is provided for automated software test design and implementation. The system includes a computer system including random access memory configured to store an automated software test design and implementation system; one or more processor devices and an operating system; and a database configured to store an initial pool of test cases, wherein the automated software test design and implementation system. The automated software test design and implementation system includes a tester configured to applying the initial pool of test cases to computer code to be tested in a testing environment to generate test results; a preprocessor configured to preprocess the test results into a predetermined format; an extractor configured to extract metadata from the test results; a sequence generator configured to generate a training sequence; a reward generator configured to calculate a reward value, r, for the pool of test cases; a learning agent configured to receive the training sequence and reward value and output a vector value; and a selector configured to utilize the vector value output from the reinforcement learning agent to produce a ranking list, prioritize the initial pool of test cases and one or more new test cases based on the ranking list, and apply the prioritized initial pool of test cases and one or more new test cases to the computer code in a testing environment to generate test results.

According to another aspect of the present invention, a non-transitory computer readable storage medium having a computer readable program for a computer implemented automated software test design and implementation is provided. The computer readable program when executed on a computer causes the computer to perform establishing an initial pool of test cases for testing computer code; applying the initial pool of test cases to the computer code in a testing environment to generate test results; preprocessing the test results into a predetermined format; extracting metadata from the test results; generating a training sequence; calculating a reward value for the pool of test cases; inputting the training sequence and reward value, r, into a reinforcement learning agent; utilizing the value output from the reinforcement learning agent to produce a ranking list; prioritizing the initial pool of test cases and one or more new test cases based on the ranking list; and applying the prioritized initial pool of test cases and one or more new test cases to the computer code in a testing environment to generate test results.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided to/for a method which is able to automatically perform testing case design, specifically testing case selection and prioritization in software testing life cycle, and perform software code testing.

Embodiments of the present invention can provide a deep Q-network reinforcement learning framework for testing case selection and prioritization. In various embodiments, the learning framework provides for automatic learning of the best strategy of testing case selection and prioritization given the historical testing case results. A reinforcement learning method is able to adapt the testing case through the continuous software development life cycle (SDLC). Q-learning is a model-free reinforcement learning algorithm based on the notion of a Q-function.

In various embodiments, an artificial intelligent agent learns from historical testing case results based on a reinforcement learning approach. Reinforcement learning is an adaptive approach to train an artificial intelligent agent to interact with the testing execution environment in order to achieve the best performance, such as Normalized Average Percentage of Faults Detected (NAPFD).

In various embodiments, the input to the invention is a set of historical testing case results, including testing duration and testing outcomes (e.g., fail, pass, or unselected). The method is able to train the reinforcement learning agent, so that the agent will interact with the testing execution environment and adapt itself. In various embodiments, the output of the method is a ranking list for all the available testing cases, where higher ranked test cases can be used for testing before lower ranked test cases. The total available time for testing will limit the number of ranked testing cases actually used for testing, so higher ranked test cases become prioritized. As the software development progresses, the number of testing cases increases. Given the time and computing resources limitation, it is not possible to perform exhaustive testing with all the available testing cases. This approach accomplishes testing case selection and prioritization to increase efficacy and efficiency of software testing given limited time and resources. The learning agent can also continue updating its policy, so that when new testing cases are added into the testing case pool, the learning agent is able to incorporate and prioritize them as well.

In some instances, test cases might be important in certain periods of time and lose relevance due to changes in testing focus. In continuous integration/continuous deployment (CI/CD) or regression test environments, testers do not have the luxury of unlimited time and resources. Testers are required to complete the software testing in time, while at the same time keeping the quality assurance in check. Therefore, software testing case design is a constrained optimization problem, where a function can be minimized or maximized subject to constraints.

Most of previous and existing technologies focus on deterministic methods. Code coverage based methods select testing cases which are relevant to the most recent code changes in order to increase code coverage, where the selected testing cases are able to execute the particular lines of source code that have been introduced most recently. Therefore, by optimizing code coverage, the software testing is able to test as many lines of source code as possible given the constraints of time and resources. It is possible that the relevant code changes might not lead to the maximal code coverage increase. Hence, the code coverage based method might always select the testing cases which cover the maximum amount of source code in terms of the number of lines of code, but still miss relevant portions of code. The testing cases which are related to the relevant code changes may not be selected in this kind of method.

A history-based approach, instead, relies on the hypothesis that test cases having failed in the past are more likely to fail in the future. Because testing case selection and prioritization is a constrained optimization problem, where an objective function may be optimized with respect to some variables in the presence of constraints on those variables, there are some methods based on optimization algorithms for objective function, such as swarm optimization and genetic algorithm. These methods can optimize different metrics, such as maximizing the number of bugs and errors detected via testing, by selecting a subset of available testing cases given the constraints of time and resources that provide the greatest efficiency and effectiveness. These optimization methods are able to choose the optimal or approximately optimal subset of testing cases from the set of available testing cases. This can increase the testing efficiency while decreasing or maintaining time and cost for software testing.

When source code and software design documents are available, an information retrieval method can be applied to rank the testing cases based on the similarity between testing cases and software design documents. Other methods include machine learning based ones using clustering in regression test cases selection. Because most of the existing methods are deterministic, they cannot handle and detect the changing software testing environment.

Embodiments of the present invention provide a system and method which is able to automatically perform testing case design, specifically testing case selection and prioritization in software testing life cycle. Embodiments of the present invention are able to learn the historical testing case results based on a reinforcement learning approach. Reinforcement learning is an adaptive approach that can train an artificial intelligent agent to interact with the testing execution environment in order to achieve the best performance such as Normalized Average Percentage of Faults Detected (NAPFD). The input for embodiments of the invention can be a set of historical testing cases and the related historical testing case results including testing duration and testing outcomes (fail, pass, or unselected). The system and method are able to train the reinforcement learning agent, so that the agent will interact with a testing execution environment and adapt itself. The output of the method is a ranked listing for all the available testing cases with higher rank being used for testing early. The agent will continue updating its policy so that when new testing cases are added into the testing case pool, the agent is able to prioritize them as well. This can improve efficiency and efficacy of the testing, and increase the reliability of released software, while reducing expensive fixes. Higher ranked tests can be utilized earlier in the testing cycle to ensure the software is thoroughly testing in a timely and efficient manner.

Figure 1:
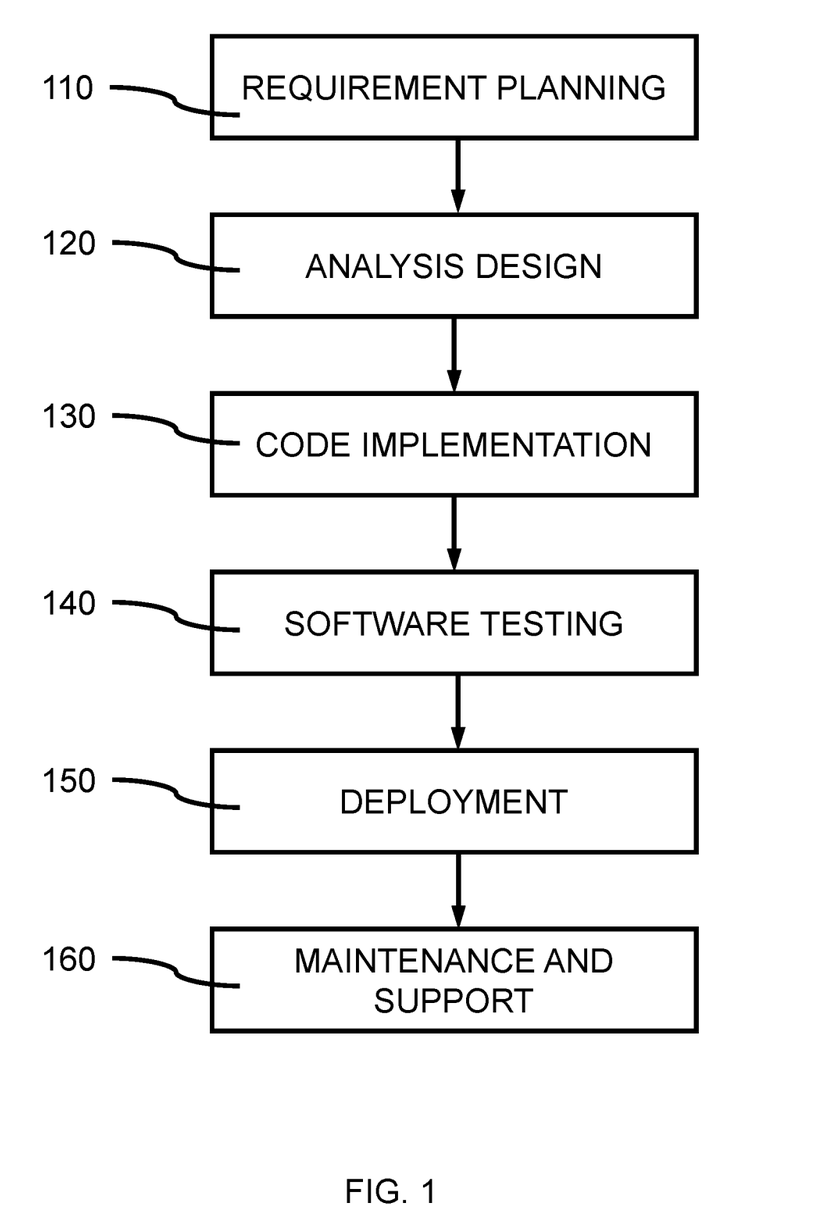
FIG. 1 is a block/flow diagram illustrating a software development life cycle, in accordance with an embodiment of the present invention.

FIG. 1 is a block/flow diagram illustrating a software development life cycle (SDLC), in accordance with an embodiment of the present invention.

In various embodiments, a software development life cycle (SDLC) can start with software requirement analysis and planning 110 for the software development. The requirements can originate from a business purpose intended for the final software solution or product. Then the software development life cycle can proceed to the analysis design 120, which includes, but is not limited to, software architecture design, programming language selection, software development environment selection and many others. Once the analysis design 120 is done, the next stage is code implementation 130, which materializes the software product in a suite of programming languages. Once the implementation 130 is done, software testing 140 is applied to ensure the quality and correctness of the software product or solution. If the software product or solution passes the testing, it can be shipped to a customer's site and deployed/installed 150. Ongoing maintenance and support 160 can be provided to customers for continuing improvements and satisfaction.

Software testing 140 can include unit test(s), integration test(s), functional test(s), system test(s) and performance test(s). Unit tests check individual methods and functions of the classes, components or modules. Integration tests focus on different modules or services to make sure they work well together. Functional tests focus on the correctness of a software application for the business requirements. When a software product is ready for deployment, it can be subjected to the system test which verifies that various user flows work as expected, and a performance test to check the behaviors of the system when it is under significant load. Another application scenario is in regression tests, where various tests are executed before major feature release to determine that the new features do not interference the existing ones.

Figure 2:
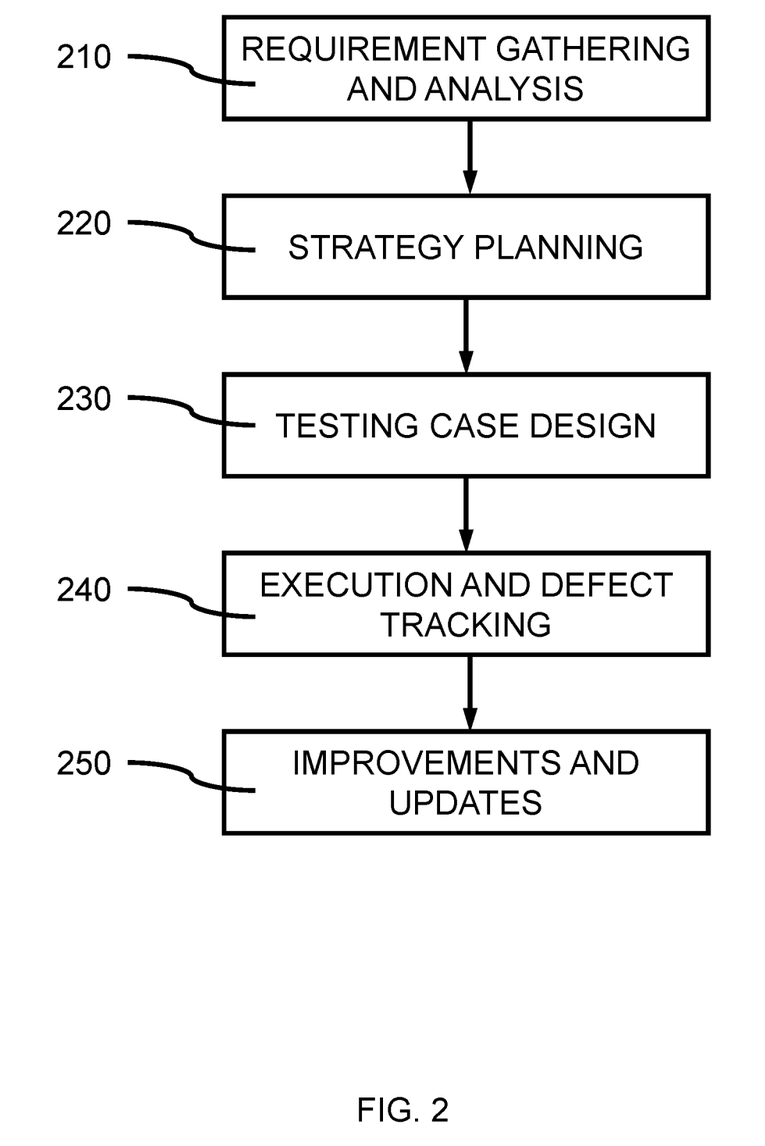
FIG. 2 is a block/flow diagram illustrating software testing stages, in accordance with an embodiment of the present invention.

FIG. 2 is a block/flow diagram illustrating software testing stages, in accordance with an embodiment of the present invention.

In one or more embodiments, software testing can consist of five different stages, including, requirement gathering and analysis 210, testing strategy planning 220, testing case design 230, test execution and defect tracking 240, and improvement with updates 250. Requirement gathering and analysis 210 analyzes the business requirements regarding features of the software product and solution. The requirements can originate from the business purpose of the final solution or product. Testing strategy planning 220 finalizes how to proceed with the testing, including what type of software testing will be used and conducted. Testing case design 230 determines the features of the test cases to be utilized for the software testing. Test case design 230 is also concerned with testing case selection and prioritization. As the software development process progresses, more and more testing cases can be developed and added into the existing testing case pool to test the newly introduced code. As the software development progresses, the number of testing cases available also increases. Given the resource and time restrictions of software testing, the testing case design needs to generate an optimal, or near optimal, testing case subset executed in an ordered manner, such that any software bugs and faults will be revealed as early as possible. Once testing features have been determined and the testing cases are selected and testing order is finalized, the execution and defect tracking 240 stage can perform the testing and record various bugs and faults discovered during the process. The output of the execution stage can be used for debugging the faults and developing improvements and updates 250 to the software. The output of the execution stage can be used by programmer(s) to direct the efforts to fix the bugs and/or faults by correcting the software code, where the execution of the test cases and results can be used for debugging.

Figure 3:
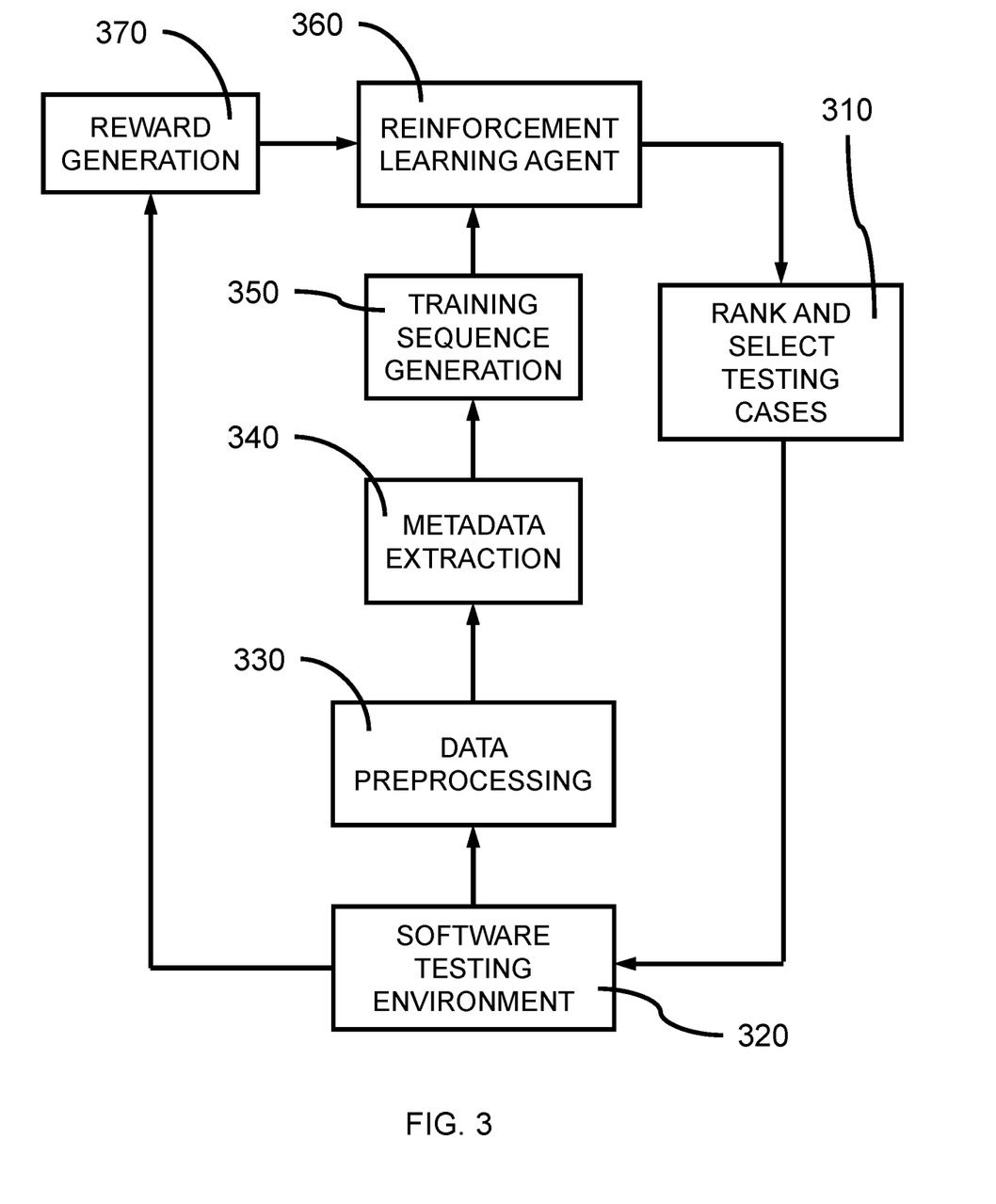
FIG. 3 is a block/flow diagram illustrating a system/method for automated test generation and selection of test cases for software testing, in accordance with an embodiment of the present invention.

FIG. 3 is a block/flow diagram illustrating a system/method for automated test generation and selection of test cases for software testing, in accordance with an embodiment of the present invention.

Testing case prioritization facilitates testing discovery of software bugs and faults as early as possible. Developers can then respond and investigate the faults in a timely manner. Testers may not have unlimited time and resources, so prioritization can facilitate more efficient and effective software testing.

In ranking and selection block 310, a set of available test cases can be ranked, and a subset of the set of available test cases can be selected based on the ranking assigned to each test case. The available set of test cases can come from an initial pool of test cases that were either previously existing or prepared for testing the particular computer code/program. The initial pool of test cases and later developed test cases can be stored in a database configured to store test cases. Because software testing is an accumulative and ongoing process, an initial set of testing cases can be the ones created to test a first small set of features and source codes. These test cases can be prepared at the beginning of the source code development, for example, a first set of functions of a computer program in development. Subsequently developed test cases can be added to the pool as the software development continues. Initially, when the feature set is small and is a small amount of source code to be tested, all available test cases may be run.

In various embodiments, a ranking activity can be applied to the pool of available test cases to prioritize the order of the cases. The test cases can be prioritized based on a weight according to previous test results. The initial run of test cases, however, may not have been ranked or prioritized. As software developers create more and more testing cases throughout the software development life cycle, the pool of available test cases increases. The number of testing cases can increase to a point where it may no longer be feasible to execute all available testing cases for each release cycle due to time and resource constraints. Therefore, it can be beneficial to select a subset of testing cases that meet the time and resources limit by ranking the available test cases according to certain criterion. The ranking method can be based on the reinforcement learning approach which will optimize a reward function, and can maximize a reward value or sum of reward values.

In various embodiments, a ranking activity can utilize a value output from a reinforcement learning agent 360 to produce a ranking list based on the descending order of the values, as a vector. This ranking vector can be treated as the action in the reinforcement learning framework. There may not be a ranking value or vector for the initial set of test cases. In various embodiments, the size of the ranking list and vector can be the same as the total number of testing cases. The reinforcement learning agent 360 can rank and reorder the entire testing cases set, wherein the top ranked testing cases can be reordered to be prioritized and at the top of the ranking list. Because the duration of each testing case has been extracted from the output of a Metadata Extraction block 340, given the total allowable time for each testing cycle, the number of top ranked testing cases with the total testing time less than or equal to a testing time requirement/limitation (i.e., total allowable time) can be selected and sent to a software testing environment. A selected subset of testing cases ordered by ranking activity 310 is considered an action, a, that can be performed towards the software testing environment 320.

In software testing environment block 320, the software testing environment is the testing framework in which the test cases selected in block 310 are applied to the software being tested. In various embodiments, the output list of test cases from the ranking activity in block 310 informs the software testing environment 320 which selected testing cases to execute on the software being tested, and in what order. The testing environment can perform the software testing and output the results, which can include pass and fail determinations. The testing environment can involve code instrumentation, testing case execution, and results analysis. In various embodiments, the software testing environment can be a customer's software testing environment, and the method can be executed by the customer or as an independent cloud-based solution.

In data preprocessing block 330, because there are multiple commercial software testing products deployed by different companies, data preprocessing can extract the relevant information from the existing software testing environment and standardize the input information to a predetermined format. The data preprocessor can extract historical results of testing cases such as fail, pass or unselected. The data preprocessor can be very flexible, and can include a core module and a modifiable API, which can be easily modified and adapted to different software testing environments and scenarios. The data processing component can also standardize the input information format for subsequent functions.

Figure 4:
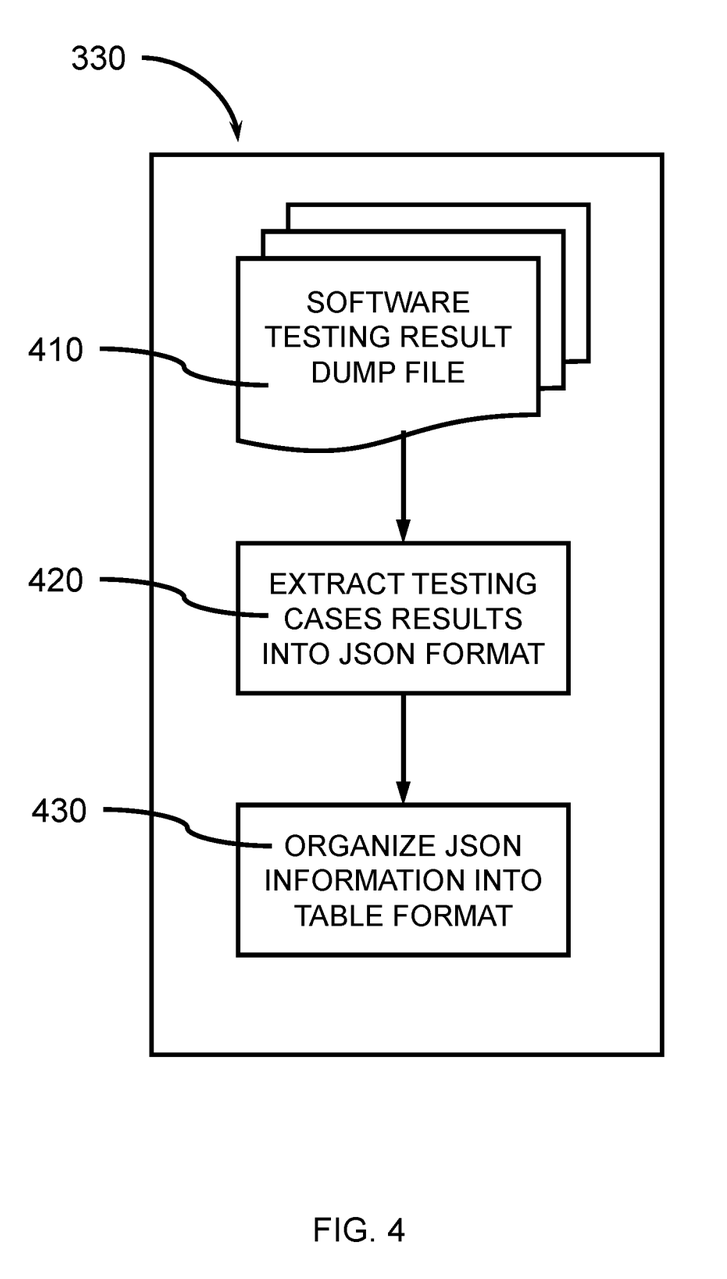
FIG. 4 is a block/flow diagram illustrating a system/method for data preprocessing, as shown in FIG. 3, in accordance with an embodiment of the present invention.

In metadata extraction block 340, the historical results from testing cases and their derivatives and metadata, such as time duration can be extracted for each of the test cases. Therefore, component 340 extracts such metadata information from the output of the data preprocessing 330, and a software testing results dump file 410. The time duration can be obtained by the difference between starting and ending time of each testing case from the software testing results dump file 410. The software testing results dump file 410 can come from the output of software testing cases historical results.

In training sequence generation block 350, training samples can be generated from the output of the software testing results dump file 410 and metadata information 340 obtained by metadata extraction block 340 to train the reinforcement learning agent 360. At each time instance, the component can extract a fixed interval of historical results for all of the testing cases. The time interval parameter can be flexible, and dependent on the specific application scenarios. In various embodiments, users can select a different interval length, for example, the results of four (4) previous results can be used.

In various embodiments, position encoding can be used to add different values into the training samples because of re-ranking of testing cases in a later stage. The position encoding, PE, for a structured list is given by the following equation:

$$PE(pos, 2i) = \sin\left(\frac{pos}{10000^{2i/d_{model}}}\right),$$

where pos denotes the position of the testing cases in the sequential order, as ranked.

Where $d_{model}$ is the number of testing cases, i is the index/element count of the testing case. The size of the position encoding vector is the same as the total number of testing cases. The position encoding will be dependent on the ranking output of block 310. A training sequence, also referred to as an episode, can be generated at each time instance. The number of training instances can be determined by users. In various embodiments, a range of about 100 to about 200 training samples can be used for software testing scenarios.

Because the reinforcement learning agent 360 is interacting with the software testing environment 320, it is able to select and remove particular testing cases to form a revised or final subset of test cases along the procedure. Each selection and removal in the reinforcement learning step is able to improve a reward function provided for the outcomes of the testing cases through the testing environment. At each training round, the metadata information is different because the pass and failure information is different for each testing case executed by the software testing environment 320. Therefore, the training data will be different at each round of process.

In the reinforcement learning agent block 360, the reinforcement learning agent is trained to interact with the testing environment 320 for testing case selection and prioritization in a time constrained manner. The reinforcement learning agent 360 can be represented with an attention network which is in a matrix format. The size of the matrix is equal to the length of total testing cases. In various embodiments, the attention matrix can learn the inter-relationships, such as similarity among different testing cases and weight the testing case, to rank the testing cases according to their historical results, for example, the number of bugs revealed. The inputs to the reinforcement learning agent 360 can include two parts, one is from the output of training sequence generation 350, which is the training sequence called states, s, and the other is the output of a reward generator 370 called reward, r. The states are the observations of reinforcement learning agent 360 from the testing environment 320. The state includes the pass or failure of each testing case, the overall time and resource it took to execute the test case and entire testing case subset, and other information. The reward, r, is the feedback from the environment when the action is performed towards the environment. For example, if the reward is defined as the ratio of passed testing case over the failed one, then the reward can be calculated after the entire subset of testing cases is processed. Another reward example is a weighted sum of testing case success ratio and execution time. The output of an attention matrix is a vector of numbers with the same size of the length of testing cases. The numbers represent the importance of each testing cases in the particular testing cycle. The action, a, is what the reinforcement learning agent 360 performs on the entire set of testing cases and is based on the reward output, it will produce the ranking list to determine which testing case will be executed first. A reward can be determined for each timestep.

In various embodiments, the training of the reinforced learning agent 360 is based on Q-learning given the multiple training sequences generated throughout the interaction between the agent 340 and the environment. Each training sample contains state, reward and action, i.e. (s, r, a). The updating rule for Q-learning is given by the following equation:

$$Q(s,a) = (1-\alpha)Q(s,a) + (r + \gamma \max Q(s,a)),$$

where α is the learning rate and is defined as how much the agent accepts the new value vs the old value, γ is a discount factor and is used to balance immediate and future reward. The value of γ can be in a range of about 0.8 to about 0.99, or 0.9 to 0.99. Q(s, a) represents the overall reward criterion that the reinforcement learning agent 360 will use to output the optimal action.

In reward generator block 370, the reinforcement learning agent 360 requests the reward from the test environment to guide itself towards optimal action output from ranking and selection 310. Therefore, the purpose of learning agent 360 is to generate a reward based on the outputs of 350 and 370, as well as 310 and 320. When the ranking component 350 ranks those failed testing cases higher, then the reward will be higher and vice versa. In various embodiments, the reward function can penalize those ranking outputs from 310, which place non-fault testing cases ahead of fault testing cases. By structuring the reward function in such manner, the reinforcement learning agent 360 can be forced to produce actions that rank the fault testing cases higher. This approach uses the following reward function:

$$r = \begin{cases} \dfrac{\sum_{i=1}^{F} x_i \in F^{x_i}}{F*P} & \text{if } F, P \neq 0 \\ 0, & \text{if } F = 0 \\ 1, & \text{if } P = 0 \end{cases}$$

Where F is the total number of failed testing cases, P is the total number of passed testing cases, each $x_i$ is a member of a set of failed testing cases, and the number, $x_i$ indicates how many passed testing cases it ranks higher than, and "i" is an index. In various embodiments, the reward value, r, can be normalized between 0 and 1. If the selected testing cases are all failed testing cases (i.e., P=0), then the reward is 1. On the other hand, if the selected testing cases are all pass testing cases (i.e., F=0), then the reward is 0. Otherwise, the reward is between 0 and 1. When all the failed testing cases are ranked higher than all the passing testing case, then the summation of the nominator will be F*P because each $x_i$=P (each $x_i$ is valued at a total number of passing testing case because it ranks higher than all of them). The reward function will be input the reinforcement learning agent 360 and be used for training the agent in the Q-learning framework.

In various embodiments, new test cases can be designed and developed based on the reward function results and testing output that improve testing results and/or reduce the time requirements of test case. The new test case can be incorporated into the test case set for testing, evaluation, and ranking. Software programmer(s) and developer(s) can use the results to determine the features of the test cases with the highest rankings to guide development of the new test cases. Software programmer(s) can design and prepare new test cases to test the inputs and verify the output of the software program and/or computer system based on the output of the reinforcement learning agent 360 and reward generator 370, such that the reward value, r, improves.

FIG. 4 is a block/flow diagram illustrating a system/method for data preprocessing, as shown in FIG. 3, in accordance with an embodiment of the present invention.

This shows individual components of data preprocessing 330.

In block 410, a software testing results dump file is generated. This testing results dump file can contain the historical results of output from software testing cases. The testing results can be dumped into files, and/or can be stored in a relational database. Because different software companies might employ different testing environments, the testing environment can utilize different APIs (Application Program Interfaces).

In block 420, testing cases results are extracted and/or converted into a JSON (JavaScript Object Notation) format. This module is a flexible API to connect to the customers' testing environment results API (410). It is flexible and easily adaptable to different testing environment. The JSON format organizes the information into human-readable text for transmitting the extracted data. The JSON format of the information can be further stored into files or directly streamed into the succeeding module, for example, metadata extraction 340. It is a key-value pair as {timestamp; testing results}. Each testing case will have multiple such key-value pairs to record its historical results.

In block 430, the JSON Information is organized into a table format. This module transforms the output from 420 into a table format such as the one shown in Table 1 below. The transformation is done by organizing the results for each testing case by time stamp throughout the available past history.

TABLE 1

Sample Output of Historical Results

|     | t1 | t2 | t3 | t4 | t5 | t6 |
|-----|----|----|----|----|----|----|
| TC1 | 0  | 1  | 1  |    | 0  | 0  |
| TC2 | 0  | 0  | 1  |    | 0  | 0  |
| TC3 |    |    | 0  | 1  | 1  |    |
| TC4 |    | 0  | 0  | 0  | 1  |    |
| TC5 |    |    | 1  |    | 0  | 0  |
| TC6 |    |    |    |    | 0  | 1  |

For Table 1 each test case, TC, 0=pass, 1=fail, and blank/empty=unselected.

Table 1 represents the extracted information of historical testing results in a table format. Each row represents different testing cases, TC. Each column shows the historical testing results at different time points, t1, t2, etc. Each cell shows the testing result for a particular testing case, 0 being pass, 1 being fail and an empty cell being unselected.

Figure 5:
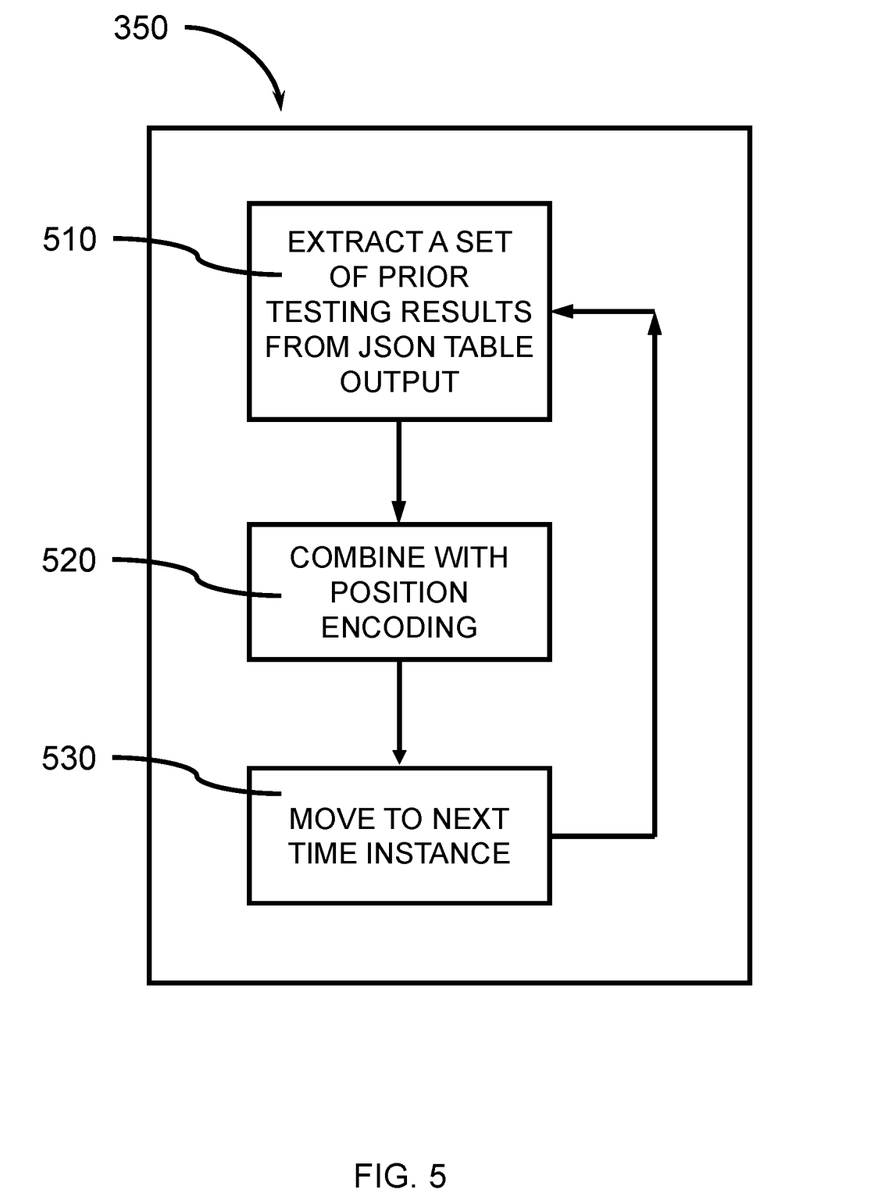
FIG. 5 is a block/flow diagram illustrating a system/method for training sequence generation, as shown in FIG. 3, in accordance with an embodiment of the present invention.

FIG. 5 is a block/flow diagram illustrating a system/method for training sequence generation, as shown in FIG. 3, in accordance with an embodiment of the present invention The flow diagram shows the actions within training sequence generator 350.

In block 510, a set of prior testing results is extracted from the output of the data preprocessor 330. At each time instance, the training sequence generator 350 can extract a fixed interval of historical results for all of the testing cases. This can use a previous N time instances results, where N can be a predetermined or user set parameter. Since this parameter is flexible, dependent on the specific application scenarios, users can select different interval length. N can be an integer, for example, from 1 to 10.

In block 520, the output of 510 can be combined with a position encoding. The purpose of position encoding is to add different values into the training samples because of re-ranking of testing cases in the later stage. The position encoding is given by the following equation:

PE(pos, 2i)=sin (pos/$10000^{2i/dmodel}$), where pos denotes the position of the testing cases in the sequential order, as ranked, where dmodel is the number of testing cases, and i is the counting element (index) for the number of test cases. The size of the position encoding vector is the same size as the total number of testing cases. The position encoding will be dependent on the ranking output of rank and select block 310.

At each occurrence of 510 and 520, sequence generation block 350 can generate a training sequence, called an episode. The number of training instances can be determined by users. In most cases, the number of training samples can be in the range of about 100 to about 200.

In block 530, when one training episode is generated, the process moves on to the next time instance, and the same training episode generation procedure starts again but with different historical results as it has moved one step further along. The whole training data generation will continue along with the interaction between the reinforcement learning agent and the software testing environment.

Figure 6:
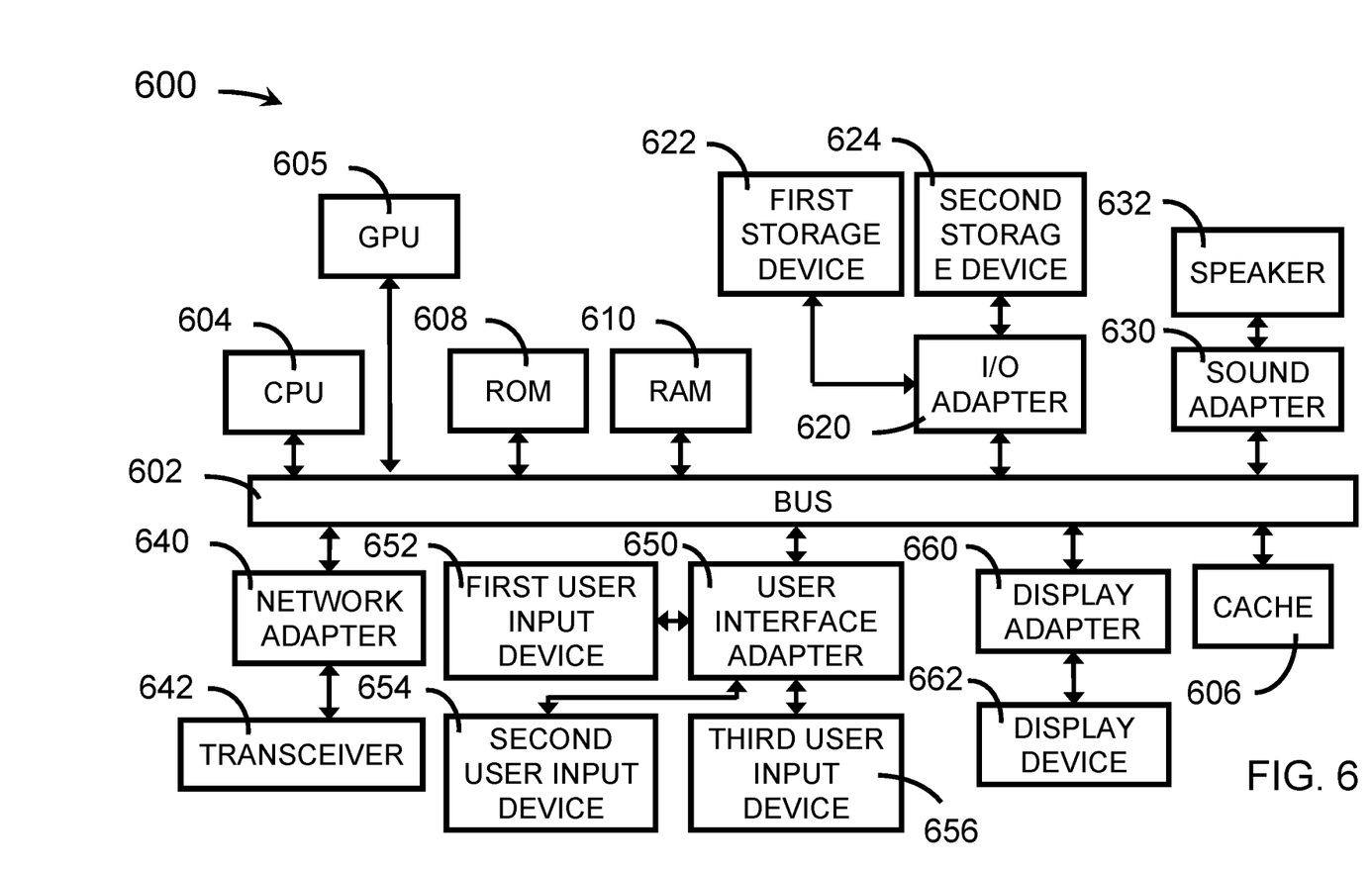
FIG. 6 illustrates an exemplary processing system 600 to which the present methods and systems may be applied, in accordance with an embodiment of the present invention.

FIG. 6 illustrates an exemplary processing system 600 to which the present methods and systems may be applied, in accordance with an embodiment of the present invention.

The processing system 600 can include at least one processor (CPU) 604 and at least one graphics processing (GPU) 605 that can perform vector calculations/manipulations operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, can be operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 354, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 can be used to input and output information to and from system 600.

In various embodiments, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Moreover, it is to be appreciated that system 600 is a system for implementing respective embodiments of the present methods/systems. Part or all of processing system 600 may be implemented in one or more of the elements of FIGS. 1-5. Further, it is to be appreciated that processing system 600 may perform at least part of the methods described herein including, for example, at least part of the method of FIG. 3.

Figure 7:
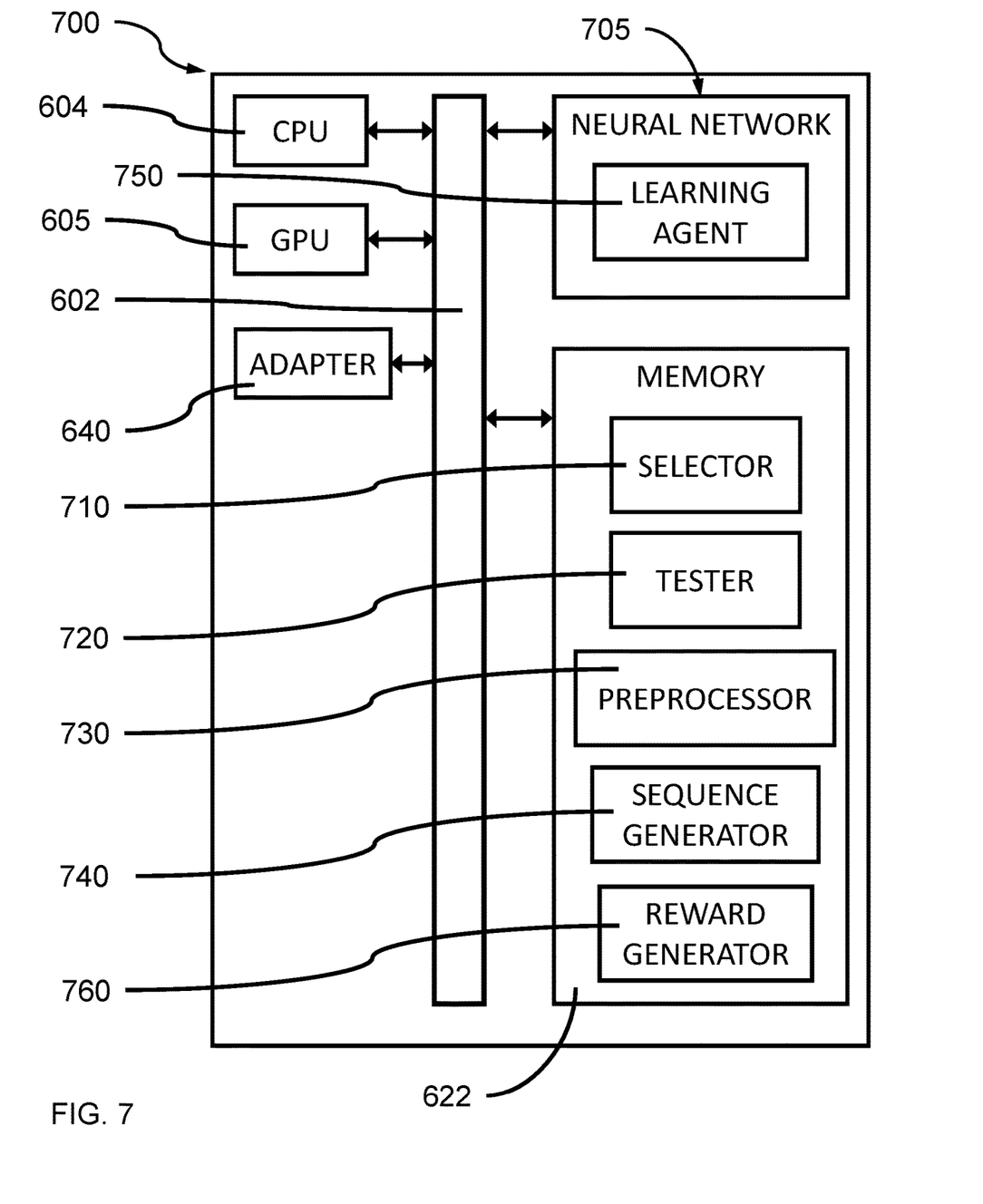
FIG. 7 is an exemplary processing system configured to implement reinforcement learning for testing case selection and prioritization, in accordance with an embodiment of the present invention.

FIG. 7 is an exemplary processing system configured to implement reinforcement learning for testing case selection and prioritization, in accordance with an embodiment of the present invention.

In one or more embodiments, the processing system 700 can be a computer system 600 implementing a neural network 705 to perform a computer implemented method of ranking and selecting test cases based on a reward algorithm and learning agent.

In various embodiments, the processing system 700 can include a Selector 710 that can be configured to select a subset of test cases from a ranked set of test cases. The Selector 710 can also be configured to rank a set of available test cases ordered by ranking activity 310 based on a ranking vector generated by a reinforcement learning agent 360 implementing a reinforcement learning framework. The Selector 710 can be stored in memory 622, and executed by the processor(s) 604, 605.

In various embodiments, the processing system 700 can include a Tester 720 configured to utilize the selected subset of ranked test cases to test program code in a predetermined software testing environment 320. The Tester 720 can also be configured to perform software testing and output the results of the testing, which can include pass and fail determinations. The Tester 720 can be stored in memory 622, and executed by the processor(s) 604, 605.

In various embodiments, the processing system 700 can include a Preprocessor 730 configured to convert the testing results into a different format from the format of output from Tester 720. The Preprocessor 730 can also be configured to extract the relevant information from the existing software testing environment 320 and standardize the input information to a predetermined format. The Preprocessor 730 can be configured to extract testing cases historical results such as fail, pass or unselected. The Preprocessor 730 can be stored in memory 622, and executed by the processor(s) 604, 605.

In various embodiments, the processing system 700 can include a Sequence Generator 740 configured to extract metadata information from the output of the data preprocessing 330 from the Preprocessor 730, and a software testing results dump file 410.

In various embodiments, the processing system 700 can include a Learning Agent 750 configured to generate training samples from the output of the software testing results dump file 410 and metadata information 340 obtained by metadata extraction block 340 to train the reinforcement learning agent 360. The Learning Agent 750 can also be configured to generate values for output and produce a ranking list based on the descending order of the output values as a vector. The Learning Agent 750 can be implemented by a neural network 700 using the processor(s) 604, 605, where the Learning Agent can be implemented with a deep Q-network, where Q-learning is a model-free reinforcement learning algorithm.

In various embodiments, the processing system 700 can include a Reward Generator 760 configured to calculate a reward value called reward, r, based on the outputs of software testing environment block 320 and ranking and selection block 310. The Reward Generator 760 may also be configured to provide input to the Learning Agent 750 for reinforcement learning agent 360 and be used for training the learning agent in the Q-learning framework. The Reward Generator 760 can be stored in memory 622, and executed by the processor(s) 604, 605.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for automated software test design and implementation, comprising:
   establishing an initial pool of test cases for testing computer code;
   applying the initial pool of test cases to the computer code in a testing environment to generate test results;
   preprocessing the test results into a predetermined format;
   extracting metadata from the test results, wherein the extracted metadata includes historical results from each of the test cases and a time duration for each of the test cases;
   generating a training sequence, wherein the training sequence generates training samples from a software testing results dump file and the extracted metadata;
   calculating a reward value for the pool of test cases, wherein the reward value is calculated using $$r = \begin{cases} \dfrac{\sum_{i=1}^{F} x_i \in F^x i}{F*P} & \text{if } F, P \neq 0 \\ 0, & \text{if } F = 0 \\ 1, & \text{if } P = 0 \end{cases}$$

where F is the total number of failed testing cases,
   P is the total number of passed testing cases, each $x_i$ is a member of a set of failed testing cases, and i is the index;
   inputting the training sequence and reward value into a reinforcement learning agent to generate and output a vector value;
   utilizing the vector value output from the reinforcement learning agent to produce a ranking list;
   prioritizing the initial pool of test cases and one or more new test cases based on the ranking list; and
   applying the prioritized initial pool of test cases and one or more new test cases to the computer code in a testing environment to generate test results.

2. The method as recited in claim 1, further comprising selecting a subset of the set of available test cases based on the ranking assigned to each test case.

3. The method as recited in claim 1, wherein preprocessing the test results includes converting the test results into a JSON (JavaScript Object Notation) format.

4. The method as recited in claim 1, wherein the reinforcement learning agent selects and removes particular testing cases from the pool of test cases to form a revised subset of test cases.

5. A non-transitory computer readable storage medium comprising a computer readable program for a computer implemented automated software test design and implementation, wherein the computer readable program when executed on a computer causes the computer to perform the steps of:
   establishing an initial pool of test cases for testing computer code;
   applying the initial pool of test cases to the computer code in a testing environment to generate test results;
   preprocessing the test results into a predetermined format;
   extracting metadata from the test results, wherein the extracted metadata includes historical results from each of the test cases and a time duration for each of the test cases;
   generating a training sequence, wherein the training sequence generates training samples from a software testing results dump file and the extracted metadata;
   calculating a reward value, r, for the pool of test cases, wherein the reward value is calculated using $$r = \begin{cases} \dfrac{\sum_{i=1}^{F} x_i \in F^x i}{F*P} & \text{if } F, P \neq 0 \\ 0, & \text{if } F = 0 \\ 1, & \text{if } P = 0 \end{cases}$$

where F is the total number of failed testing cases,
   P is the total number of passed testing cases, each $x_i$ is a member of a set of failed testing cases, and i is the index;
   inputting the training sequence and reward value into a reinforcement learning agent to generate and output a vector value;
   utilizing the vector value output from the reinforcement learning agent to produce a ranking list;
   prioritizing the initial pool of test cases and one or more new test cases based on the ranking list; and
   applying the prioritized initial pool of test cases and one or more new test cases to the computer code in a testing environment to generate test results.

6. The method as recited in claim 5, further comprising selecting a subset of the set of available test cases based on the ranking assigned to each test case.

7. The computer readable program as recited in claim 5, wherein preprocessing the test results includes converting the test results into a JSON (JavaScript Object Notation) format.

8. The computer readable program as recited in claim 7, wherein the reinforcement learning agent selects and removes particular testing cases from the pool of test cases to form a revised subset of test cases.

9. A system for automated software test design and implementation, comprising:
   a computer system including:
   random access memory configured to store an automated software test design and implementation system;
   one or more processor devices and an operating system; and
   a database configured to store an initial pool of test cases, wherein the automated software test design and implementation system comprises:
   a tester configured to applying the initial pool of test cases to computer code to be tested in a testing environment to generate test results;
   a preprocessor configured to preprocess the test results into a predetermined format;
   an extractor configured to extract metadata from the test results, wherein the extracted metadata includes historical results from each of the test cases and a time duration for each of the test cases;
   a sequence generator configured to generate a training sequence, wherein the training sequence is configured to generate training samples from a software testing results dump file and the extracted metadata;

a reward generator configured to calculate a reward value, r, for the pool of test cases, wherein the reward value is calculated using $$r = \begin{cases} \dfrac{\sum_{i=1}^{F} x_i \in F^x i}{F*P} & \text{if } F, P \neq 0 \\ 0, & \text{if } F = 0 \\ 1, & \text{if } P = 0 \end{cases},$$

where F is the total number of failed testing cases,
P is the total number of passed testing cases, each $x_i$ is a member of a set of failed testing cases, and i is the index;

a learning agent configured to receive the training sequence and reward value and output a vector value;

a selector configured to utilize the vector value output from the reinforcement learning agent to produce a ranking list, prioritize the initial pool of test cases and one or more new test cases based on the ranking list, and apply the prioritized initial pool of test cases and one or more new test cases to the computer code in a testing environment to generate test results.

10. The system as recited in claim 9, further comprising selecting a subset of the set of available test cases based on the ranking assigned to each test case.

11. The system as recited in claim 9, wherein preprocessing the test results includes converting the test results into a JSON (JavaScript Object Notation) format.

12. The system as recited in claim 9, wherein the reinforcement learning agent selects and removes particular testing cases from the pool of test cases to form a revised subset of test cases.

\* \* \* \* \*